K. ROSHOLT.
PACKING RING.
APPLICATION FILED MAY 15, 1909.
943,790.
Patented Dec. 21, 1909.
2 SHEETS—SHEET 2.
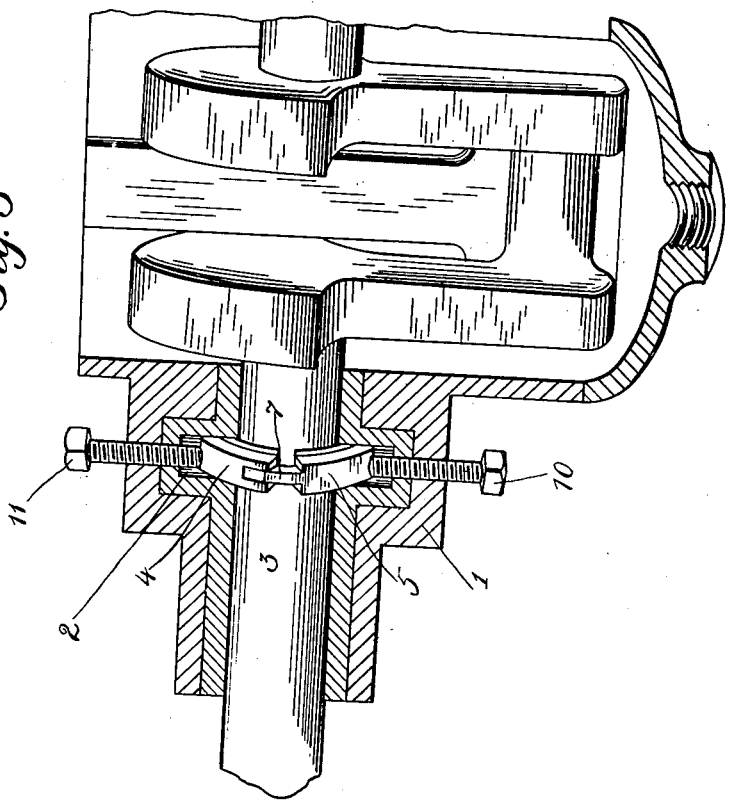
Witnesses
Nathan Abramson
Lila M. Gillespie
Inventor
Kim Rosholt.
By Alex. J. Wedderburn, Jr.
Attorney

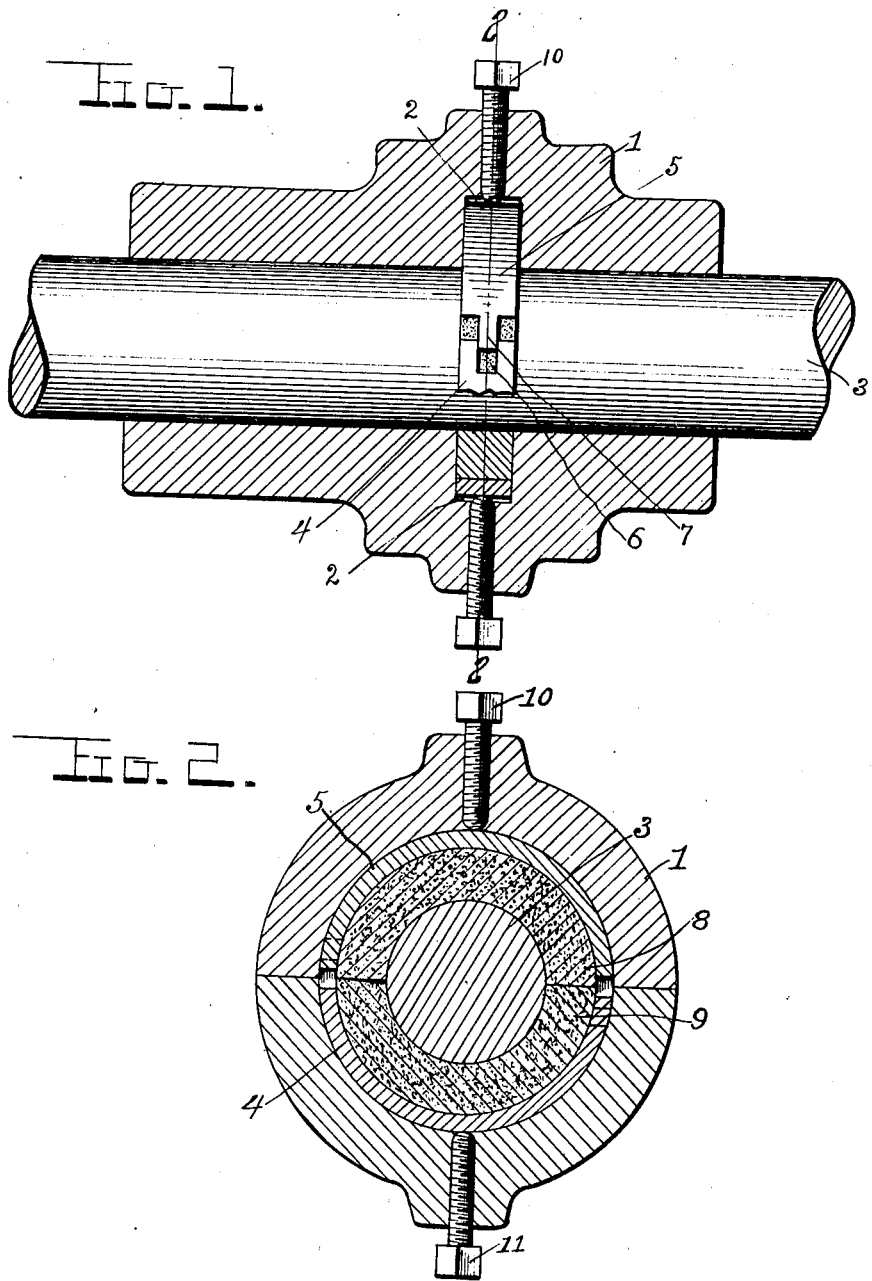

UNITED STATES PATENT OFFICE.

KIM ROSHOLT, OF EAU CLAIRE, WISCONSIN.

PACKING-RING.

943,790.  Specification of Letters Patent.  Patented Dec. 21, 1909.

Application filed May 15, 1909. Serial No. 496,229.

*To all whom it may concern:*

Be it known that I, KIM ROSHOLT, citizen of the United States, residing at Eau Claire, in the county of Eau Claire and State of Wisconsin, have invented certain new and useful Improvements in Packing-Rings, of which the following is a specification.

This invention relates to improvements in means for packing the crank shafts of internal combustion engines so that the gas in the compression chamber will be prevented from escaping.

One of the objects of the invention is the construction of a device whereby the crank shafts of internal combustion engines can be securely packed in such a manner that the packing rings can be adjusted as the bearings and crank shaft wear.

Another object of the invention is the construction of a packing ring especially useful for the crank shafts of internal combustion engines having a sectional outer ring provided with tongue and groove ends and an internal ring of webbing or other suitable material having a circumference slightly larger than the circumference of the two sections of the outer ring, when the same are closely joined together.

With the above and other objects in view the invention consists in certain novel constructions, combinations and arrangements of parts, clearly illustrated in the accompanying drawings, in which, Figure 1 is a longitudinal sectional view of a journal box having a crank shaft provided with a packing ring according to my invention, and Fig. 2 is a detail transverse sectional view taken on line 2—2 of Fig. 1. Fig. 3 is a sectional view of a crank pit and journal box with a crank shaft shown in perspective with my packing ring connected therewith.

Referring to the accompanying drawings, 1 denotes a journal box formed with an upper and a lower section detachably secured together in any suitable manner, or made in one piece as the case may be. The journal box is provided with an inner groove 2, and a crank shaft 3, having connection with the piston of an internal combustion engine, and working in a compression chamber, extends through the journal box.

Around the crank shaft 3 a packing ring consisting of an outer and an inner ring is disposed. The outer ring is formed of two sections 4 and 5, each section composing one half of the outer ring. The section 4 is formed with end grooves 6, and the section 5 is formed with end tongues 7, which tongues are adapted to enter the grooves 6. The inner ring consists of two similarly shaped sections 8 and 9, which are preferably formed of a combination of webbing and graphite, though they may be constructed of any suitable material. The outer ring sections contact with the periphery of the grooves of the journal box sections and the inner ring sections are formed with a joint circumference slightly greater than the inner circumference of the outer ring sections, so that said sections are prevented from closing against each.

As the journal bearings or crank shafts wear it is necessary to force the outer ring sections against the packing rings, and for this purpose the sections of the journal box are provided with adjusting screws, 10 and 11, which engage the outer ring sections on their inner ends. The screws may be dispensed with and spring held pins substituted if it is desired.

It will be noticed from an examination of the drawings that the packing ring is so located on the journal box as to effectively prevent the gas escaping from the compression chamber, also to prevent the admittance of free air instead of gas when the engine piston is on the suction stroke.

Having described my invention I claim and desire to secure by Letters Patent:—

1. In combination with an internal combustion engine having a compression chamber and a crank shaft working therein, a journal box having an internal groove mounted on the shaft, a sectional ring having tongue and groove engaging ends disposed in the groove, and an inner ring having a greater diameter than the first ring disposed therein.

2. In combination with an internal combustion engine having a compression chamber and a crank shaft working therein, a journal box for the crank shaft having an internal groove, an outer sectional ring having tongue and groove ends disposed in the groove, an inner ring of flexible packing material formed in sections, each section being of greater circumference than the circumference of the respective sections of the outer ring, disposed between the outer ring, and adjusting screws extending into the journal box engaging the outer ring.

In testimony whereof I affix my signature, in presence of two witnesses.

KIM ROSHOLT.

Witnesses:
  DORA LEWIN,
  C. H. AASEN.